Patented Jan. 2, 1945

2,366,491

UNITED STATES PATENT OFFICE 2,366,491

CRACKING OILS WITH A CATALYST

Gerald C. Connolly, Baton Rouge, La., assignor to Standard Oil Development Company, a corporation of Delaware No Drawing. Application May 16, 1939, Serial No. 273,887

3 Claims. (Cl. 196—52)

This invention relates to the conversion of hydrocarbon oils and pertains more particularly to using a catalyst for cracking oils.

It has heretofore been proposed to crack hydrocarbon oils by passing the oil in contact with a catalyst at suitable temperatures whereby the oil molecules are broken to form lower molecular weight products. Such operations are of particular value for production of motor fuel from higher boiling by hydrocarbons.

The type of catalyst most commonly employed heretofore for this service comprised the hydrosilicates of alumina in the form of naturally active or activated clays.

The general object of the present invention is to utilize a catalyst for the conversion of hydrocarbon oils and particularly for cracking oils which is of a different type than those heretofore used.

Other objects and advantages of the invention will be apparent from the more detailed description hereinafter.

I have discovered that a synthetic gel containing silica when combined with zirconium oxide as hereinafter described is an efficient and active catalyst for accelerating the cracking and conversion of oils.

The silica-zirconia catalyst may be prepared in various ways. One method of preparation which has been found particularly effective is to impregnate the silica preferably in hydrogel form or in the form of a high density dry gel with a decomposable salt of zirconium, such as zirconium nitrate and thereafter drying and decomposing the salt to form the zirconium oxide. In lieu of the hydrogel, the hydrous gelatinous precipitate or a heterogeneous mixture of gelatinous precipitate and hydrogel may be employed.

Another effective method of preparation is to form a plural gel containing the mixed oxides of zirconia and silica. Such a plural gel can be prepared by forming a mixed hydrosol of zirconia and silica. The mixed hydrosol upon standing will set into a plural hydrogel which may be washed, dried and activated. For example an acid solution of a hydrolyzable salt of zirconium, such as zirconium-nitrate may be combined with a sodium silicate. If concentrations of the solutions and other conditions are carefully controlled during mixing so as to maintain substantially neutral or only slightly acid conditions the mixed solution will be relatively clear and will subsequently set into a clear hydrogel. Under less carefully regulated conditions a part or all of the oxides may form gelatinous coprecipitates. Either the co-gelatinous precipitates or true plural gels may be employed in the present invention.

Another method of preparation which may be employed is to add one of the components to the hydrosol of the other. For example, zirconium oxide or a salt capable of being converted to the oxide may be added to a silica or alumina hydrosol before the latter sets into the hydrogel. Or the silica or alumina in dry or hydrous form such as dry gel or hydrogel may be added to a zirconia hydrosol.

A still further method is to mechanically mix the gels of the two components. When this method is employed it is preferred to have at least one of the components and preferably both in hydrous state during the mixture such as in the form of a hydrogel or wet gelatinous precipitate. The term hydrous state as here employed is intended to mean a state in which it contains a relatively large volume of imbibed water as distinguished from chemically combined water.

The present conversion process in its broader phases is not restricted to any particular method of preparation. Any method capable of forming an adsorptive or capillary structure containing a mixture of zirconia and silica may be employed.

The relative proportions of zirconia and silica in the catalyst may vary over an extended range without destroying the catalyst activity and catalysts having a zirconium oxide content ranging from 5 to 50% may be used for example, although from 5 to 20% is preferred.

While the catalyst is formed chiefly from zirconium oxide and silica, the conversion process does not preclude the addition of other constituents in minor amounts.

The catalytic efficiency of the product will be apparent from the following examples. In each example the efficiency of the catalyst was determined in the following manner:

An East Texas gas oil having an A. P. I. gravity of 33.8 was passed through a catalyst chamber at a rate of .6 volume of liquid feed chamber per volume of catalyst per hour. The reaction temperature was maintained at 850° F. and the pressure was substantially atmospheric. The length of cracking period between regenerations was two hours. The percentage of the oil converted into unstabilized liquid distillate boiling below 400° F. is accepted as a measure of the cracking activity of the catalyst.

It will be understood that the conditions and values given in the examples are illustrative rather than limitive.

Example I

A catalyst comprising silica and zirconia was prepared by soaking a hydrogel of silica; the dry gel of which had an apparent density of .60 with a zirconium nitrate solution of a concentration such that the resulting dried product contained about 15% zirconium oxide. The impregnated product was then drained, slowly dried and thereafter activated at a temperature of 800° F. for a 3 hour period to decompose the nitrate to the oxide. The resulting product when tested under the condition previously described resulted in 33% conversion.

Example II

Another catalyst was prepared as in Example I except that the concentration of the zirconium nitrate was controlled to produce a product having about 10% zirconium oxide. This product resulted in 33% conversion.

Having described the specific embodiment of the invention it is understood that it embraces such other variations and modifications as come within the spirit and scope thereof.

I claim:

1. A process for cracking hydrocarbon oils which comprises passing the oil to be cracked while at cracking temperature through a cracking zone containing a catalyst comprising silica and zirconia prepared by first forming a silica hydrosol, causing said hydrosol to set into a hydrogel, removing reaction impurities from the silica hydrogel so formed, and thereafter incorporating the zirconia into said hydrogel, and maintaining said oil in contact with said catalyst within said cracking zone for a period sufficient to obtain substantial cracking thereof.

2. In the process defined by claim 1, the further improvement which comprises incorporating from 5% to 20% of zirconia into said hydrogel.

3. The process defined by claim 1, wherein the preparation of the silica hydrogel is controlled so that the dry gel formed therefrom has an apparent density of about 0.69.

GERALD C. CONNOLLY.